2,945,857
Patented July 19, 1960

United States Patent Office

2,945,857
PYRIDAZINONES

William C. Hammann, Dayton, Ohio, assignor to Monsanto Chemical Company, St. Louis, Mo., a corporation of Delaware No Drawing. Filed May 6, 1955, Ser. No. 506,659

1 Claim. (Cl. 260—250)

This invention relates to the new class of compounds, 5,6-dialkyl-3(2H)-pyridazinones.

The present compounds are pharmaceutically active, possessing anticonvulsant activity as tested by the Metrazol method; oral doses of 100 to 250 mg. per kg. in rats gave 200 percent protection in this test. The new compounds are also effective hypnotics. They may also be used as intermediates for the synthesis of physiologically active compounds such as analgesics, and they are biologically active toxicants for agricultural applications, such as herbicidal uses.

The new 5,6-dialkyl-3(2H)-pyridazinones provided by the invention have the formula

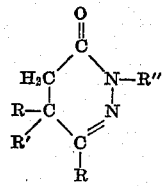

in which R is an alkyl radical of from 1 to 6 carbon atoms, R' is selected from the group consisting of hydrogen and lower alkyl radicals and R" is selected from hydrogen and hydrocarbon radicals free of aliphatic unsaturation, of from 1 to 10 carbon atoms.

Compounds having the above formula are obtained by condensing hydrazine or a mono-substituted hydrazine with a 4-oxo-alkanoic acid, its ester, or its alkali metal or ammonium salt, substantially according to the scheme

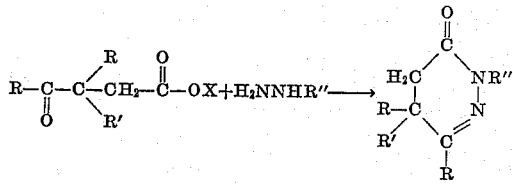

The 4-oxoalkanoic acids useful in preparing the compounds of the invention may be prepared, e.g., by free-radical addition of aldehydes to esters of $\alpha,\beta$-unsaturated acids, as described in U.S. Patent No. 2,577,133. Examples of 4-oxoalkanoic acid esters containing one substituent in the 3-position are methyl 3-methyl-4-oxovalerate, ethyl 3-methyl-4-oxohexanoate, methyl 3-ethyl-4-oxoheptanoate, phenyl 3-methyl-3-oxoheptanoate, ethyl 3-ethyl-4-oxohexanoate, tolyl 3-ethyl-4-oxovalerate, methyl 3-acetylhexanoate, ethyl 3-propyl-4-oxohexanoate, methyl 3-propyl-4-oxoheptanoate, methyl 3-isopropyl-4-oxovalerate, phenyl 3-isopropyl-4-oxohexanoate, methyl 3-acetyloctanoate, butyl 3-propionylnonanoate, methyl 3-butyrylnonanoate, butyl 3-butyl-4-oxoheptanoate, etc. Instead of the above esters, there may be reacted with the hydrazine or hydrazine derivative the free acids, e.g., 3-methyl-4-oxovaleric acid, 3-methyl-4-oxoheptanoic acid, 3-propyl-4-oxohexanoic acid, 3-butyrylnonanoic acid, 3-butyl-4-oxoheptanoic acid, etc. The alkali metal salts of the above acids, e.g., sodium 3-ethyl-4-oxovalerate, potassium 3-isopropyl-4-oxohexanoate, sodium 3-methyl-4-oxoheptanoate, etc., may also be reacted with hydrazine or hydrazine derivatives to produce the compounds of the invention.

Also suitable starting materials for preparing the new pyridazinones of this invention are 3,3-dialkyl-4-oxoalkanoic acids, which produce 5,5,6-trialkyl-3(2H)-pyridazinones. Examples of 3,3-dialkyl-4-oxoalkanoic acids are, e.g., 3,3-dimethyl-4-oxovaleric acid, 3-ethyl-3-methyl-4-oxovaleric acid, 3,3-diethyl-4-oxovaleric acid, 3,3-dimethyl-4-oxoheptanoic acid, 3-butyl-3-methyl-4-oxooctanoic acid, 3-butyryl-3-methylnonanoic acid, etc. Instead of the free acids listed above, the esters, e.g., methyl 3,3-dimethyl-4-oxovalerate, phenyl 3-butyl-3-methyl-4-oxooctanoate, etc., or salts, e.g., sodium 3,3-diethyl-4-oxohexanoate, ammonium 3-ethyl-3-methyl-4-oxoheptanoate, etc., may be reacted with the hydrazine or hydrazine derivative.

Free hydrazine may be used for the reaction, or else hydrazine salts, such as hydrazine sulfate, hydrazine hydrate, or hydrazine hydrochloride, may be used in preparing the compounds of the invention, in which case pyridazinones with no substituent on the nitrogen atom adjacent to the keto carbon atom in the ring are obtained. Alternatively, mono-substituted hydrazines, e.g., phenylhydrazine, naphthylhydrazine, methylhydrazine, benzylhydrazine, etc., may be reacted with the 4-oxoalkanoic acid, its ester or salt, in which case pyridazinones carrying a substituent, derived from the hydrazine, on one of the nitrogen atoms of the ring will be obtained.

The compounds of the invention are prepared by simply contacting the oxoalkanoic acid with the hydrazine until ring formation has occurred. Depending on the reactants and on whether a catalyst is employed, elevated, decreased or room temperature may be used in the reaction. Since the reactants are generally stable compounds, they may, for example, be heated to reflux; if a catalyst is used, heating may not be necessary. Catalysts for the reaction may be, for example, a slightly acidic catalyst such as acetic acid-sodium acetate buffer, or the reaction may be carried out in the presence of a basic catalyst, such as sodium hydroxide. If an acidic hydrazine salt such as hydrazine sulfate is used in the reaction, alkaline catalysts are preferably added to the reaction mixture; alternatively, the hydrazine acidic salt may be reacted with an alkaline salt of the keto acid. A solvent or diluent for the reaction may or may not be employed; for example, the reaction may be carried out in aqueous solution, particularly when soluble salts of the reactants, e.g., the alkali metal salts of the keto acids and the hydrazine salts, are used. Alternatively, the reaction may be carried out in an oxygenated solvent, such as alcohol or acetone, or in hydrocarbon solvents, such as benzene or hexane. The reactants generally may be used in equimolecular amounts, since they react in stoichiometric proportions, or an excess of the more readily available component may be used to assure complete reaction of the less readily available reactants. The reaction may be effected at ordinary atmospheric, subatmospheric or superatmospheric pressures. The product is readily separated from the reaction mixture, e.g., by distilling, decanting, washing or extracting.

The synthesis of the present compounds is further illustrated by the following example:

Example 5-methyl-6-propyl-3(2H)-pyridazinone was prepared as follows: A mixture of 5 g. of methyl 3-methyl-4-oxoheptanoate, 2.5 ml. of ethanol and 5 ml. of a 45 percent aqueous solution of hydrazine hydrate were refluxed for 2 hours, after which the ethanol was distilled off and the residue let cool. An oily layer separated and then solidified on standing; after the water layer had been decanted, 4.5 g. of crude product, melting at 65–70° C., remained. This crude reaction product was recrystallized from 25 percent ethanol, giving 2.5 g. of long white crystals of pure 5-methyl-6-propyl-3(2H)-pyridazinone, M.P. 77–78° C. The composition of the product was confirmed by the following analytical data:

|  | Found | Calculated for $C_8H_{14}ON_2$ |
|---|---|---|
| Percent C | 62.58 | 62.30 |
| Percent H | 8.77 | 9.15 |
| Percent N | 18.11 | 18.17 |

5-methyl-6-ethyl-3(2H)-pyridazinone, 5-butyl-6-propyl-3(2H)-pyridazinone, 5-methyl-6-butyl-3(2H)-pyridazinone, etc., are prepared similarly.

What is claimed is:
5-methyl-6-propyl-3(2H)-pyridazinone.

References Cited in the file of this patent
UNITED STATES PATENTS 2,624,730   Steck _____ Jan. 6, 1953

OTHER REFERENCES

Homer et al.: Jour. Chem. Soc., 1948, pp. 2191–2194.
Gregory et al.: Jour. Chem. Soc., 1949, pp. 2546–2549.